United States Patent [19]

Corning et al.

[11] Patent Number: 5,607,134

[45] Date of Patent: Mar. 4, 1997

[54] LOCK FOR SLIDEOUT BOX

[75] Inventors: Vern Corning, Caldwell, Id.; Dan Pocapalia, Rancho Palos Verdes, Calif.

[73] Assignee: Kit Manufacturing Company, Long Beach, Calif.

[21] Appl. No.: 228,771

[22] Filed: Apr. 18, 1994

[51] Int. Cl.$^6$ ........................................... A47F 5/00
[52] U.S. Cl. ................... 248/354.3; 248/200.1; 248/351; 254/133 A; 254/100
[58] Field of Search ................... 248/354.3, 351, 248/354.1, 354.4, 200.1; 254/133 A, 100

[56] References Cited

U.S. PATENT DOCUMENTS

| | | | |
|---|---|---|---|
| 1,681,010 | 8/1928 | Raggio | 248/200.1 |
| 2,237,230 | 4/1941 | Johnson | 254/98 |
| 3,298,667 | 1/1967 | Grantham et al. | 254/100 |
| 3,738,613 | 6/1973 | Hollis, Jr. | 254/98 |
| 3,902,236 | 9/1975 | Deem | 254/100 |
| 4,019,765 | 4/1977 | Nichola | 248/354.4 |

*Primary Examiner*—Karen J. Chotkowski
*Assistant Examiner*—Anita M. King
*Attorney, Agent, or Firm*—Richard D. Slehofer

[57] ABSTRACT

A lock is provided for the slideout box of a travel trailer which consists of an extensible lead screw locking member which is placed on top the slideout box when in its inner position to apply a firm inward force keeping the box pressed inwardly of the trailer with consequent compression of the sealing gasket around the outer face of the slideout box.

2 Claims, 2 Drawing Sheets

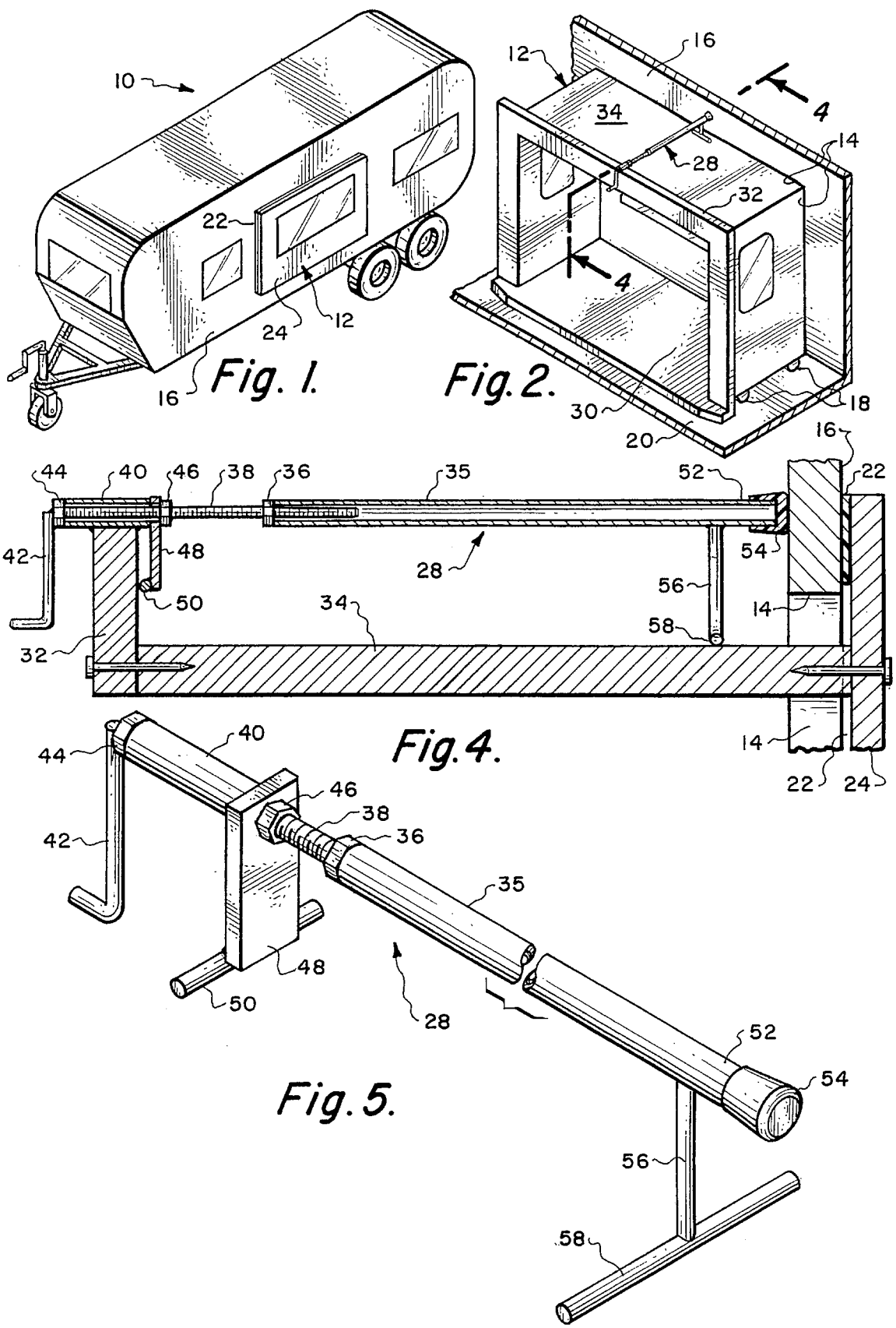

LOCK FOR SLIDEOUT BOX

This invention relates to a locking member for a slideout box in a housing unit such as a travel trailer.

BACKGROUND

Travel trailers are often provided with an auxiliary compartment, called a slideout box, which is mounted in a vertical outer wall of the trailer so that when the trailer is in camp position, the box can be slid outwardly giving added room inside the trailer proper. When the trailer is to be moved, the box is slid inwardly so that the outer wall of the box is substantially flush with the wall in which the box is mounted. The movement of the box is effected by a drive motor which moves the box from its inner position within the body of the trailer, to its outer position where it projects beyond and outside the trailer wall. The drive motor may be relatively small since the movement of the slideout box does not need to be effected rapidly. However, when the box is in its innermost position, the drive motor is of insufficient torque to keep the slideout box firmly sealed against the trailer wall.

To the end that the box may be sealed firmly against the trailer wall when in its inner position, the present invention provides a locking member for holding the box firmly inward whereby it may be well sealed against the outer wall.

SUMMARY OF THE INVENTION

The present invention comprises a locking member which rests on the top of the slideout box. The locking member preferably takes the form of a lead screw with a crank on the end, so that with the locking member in place, the user simply extends the lead screw until the slideout box is firmly pressed against the outer surface of the trailer wall to effectuate the desired sealing.

DESCRIPTION OF THE DRAWINGS

In the drawings

FIG. 1 is a perspective view of a typical housing unit to which the present invention is adapted, and in the form of a travel trailer.

FIG. 2 is a fragmentary perspective view of the slideout box to which the present locking device is applied.

FIG. 4 is a fragmentary cross section taken on line 4 in FIG. 2.

FIG. 5 is a perspective view of the locking member alone.

DETAILED DESCRIPTION

Figure 3:
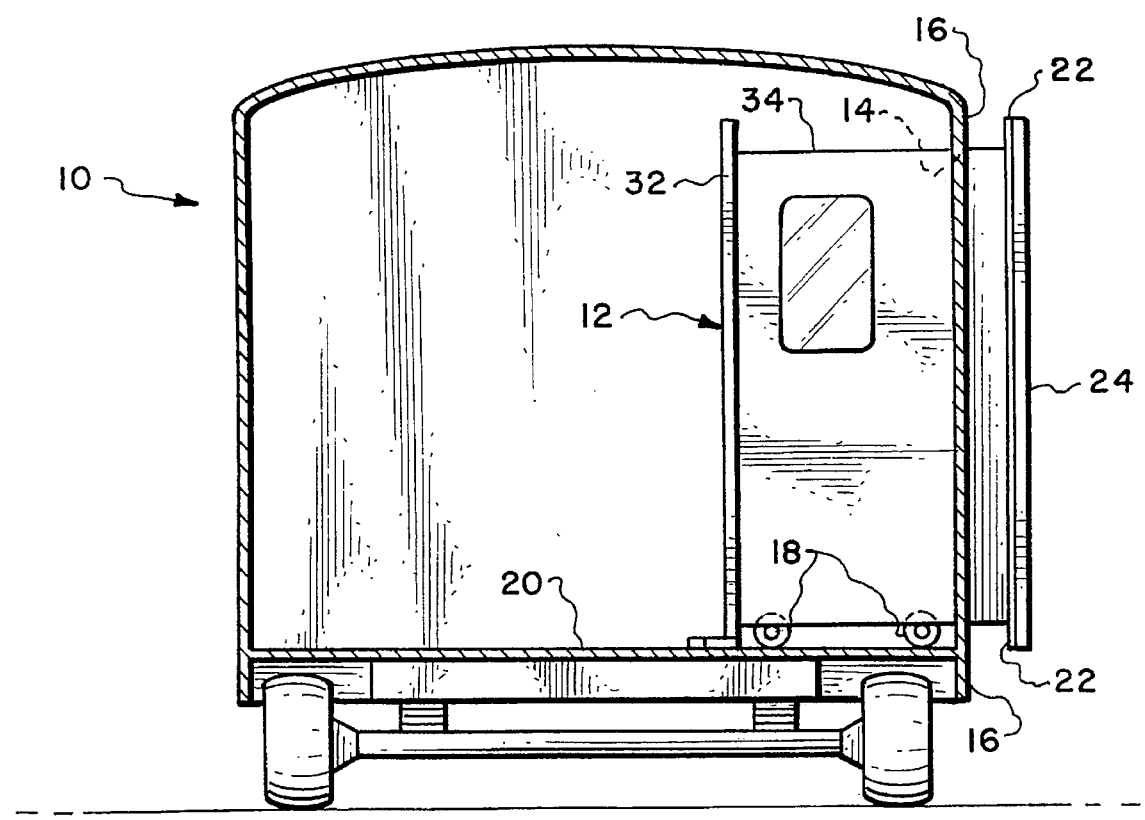
FIG. 3 is a cross sectional view of the trailer showing the slideout box in its inner position.

Referring to the drawings, 10 represents a housing unit in the form of a travel trailer, which has a slideout box 12 mounted in an opening 14 formed in the left vertical sidewall 16 of the trailer 10. The box 12 is mounted on wheels 18 (FIG. 3) so as to be movable transversely of the trailer as it rolls along the floor 20 of the trailer 10. This movement is effected by a drive motor and suitable gearing not shown.

When the box 12 is moved to its inner position shown in FIGS. 2 and 3, it is sealed against the outer wall 16 of the trailer 10 by gasket 22 which extends around the outer face of the box 10. Typically, the drive motor for the slideout box 10 is of insufficient torque to by itself hold the box sealed tightly against the outer wall 16, particularly when the trailer is moving. The seal 22 is mounted to and around outer flange 24 around the outer face of the box wall 16. When the box 10 is in its innermost position and the trailer is being towed, it is difficult to maintain the seal between the sealing member 22 and the outer wall 16.

To the end of maintaining a tight seal between the gasket 22 and the wall 16, there is provided a locking member shown in FIGS. 4 and 5, consisting of an elongate extensible brace member 28. Around the inner face 30 of the box 12 is secured a flange 32, which extends along the inside edge of the top wall 34 of the box 12. As shown in FIG. 4., the extensible member 28 applies a compressive force between the flange 32 and the inner face of the trailer wall 16, so as to keep the gasket 22 pressed tightly against the outer face of the wall 16, thus sealing the box 12 to the trailer body.

The member 28 comprises a tube 35 having a nut 36 welded to the inner end thereof, forming a female threaded connection for a lead screw 38. The lead screw 38 is journaled in a bearing 40 and has a crank 42 on the end thereof. Welded to the lead screw 38 and bracketing the bearing 40, is an outer nut 44 and an inner nut 46, which form a thrust bearing for the lead screw as it is cranked in and out of the tube 35. A flange 48 is welded transversely to the inner end of the bearing 40 adjacent to the thrust bearing nut 46, and has an abutment bar 50 welded thereto.

The abutment bar 50 bears against the inner face of the box flange 32, FIG. 4, so that when the lead screw is extended by turning of the crank 42, the opposite end 52 of the tube 35, to which is secured a resilient cap 54, bears against the inner face of the trailer wall 16 and applies a sealing force to the gasket 22.

Appropriate spacing of the end 52 of the tube 35 above the top wall 34 of the slideout box 12 is provided by a standard in the form of a T bar 56, to the lower end of which is welded a cross piece 58.

In use, after the slideout box 12 has been moved into its inner position, the brace member 28 is placed on top 34 of the slideout box 12, with the end cap 54 bearing against the inner face of the trailer wall 16, and with the flange bar 50 adjacent the inner face of the flange 32 on the slideout box 12. The crank is then turned, withdrawing the lead screw 38 from the tube 35, and causing the bearing member 50 on the flange 48 to bear firmly against the flange 32 on the inner face of the slideout box 12. This action also presses the end 52 and cap 54 firmly against the wall 16 of the trailer and applies an inward force to the slideout box 12, thereby sealing the outer flange 24 of the box around the face of the opening 14 in the wall 16 by compressing the gasket 22.

The apparatus is then in readiness to be moved without danger of leakage into the trailer around the opening 14. When the trailer is stopped and camping is to be instituted, the crank is rotated in such a direction as to ensmall the brace member 28 and allow it to be lifted out of the way. Thereafter the drive motor may be actuated to extend the slideout box outwardly of the trailer 10 through the opening 14 in conventional fashion.

What is claimed is:

1. An extensible brace member comprising:

a tube having internal thread means;

a lead screw threaded therein;

a bearing on said lead screw;

a nut secured to said lead screw intermediate said tube and said bearing;

a crank on said lead screw;

a nut secured to said lead screw adjacent said crank;

said nuts constituting a thrust bearing for said lead screw in said bearing;

a flange secured to said bearing transverse of said lead screw;

a standard transversely secured to said tube remotely of said flange; and said tube internal thread means comprising a nut secured to said tube and threaded by engaging said lead screw.

2. The extensible brace member as recited in claim 1 further comprising:

a resilient cap mounted at the end of said tube opposite that of said crank.

\* \* \* \* \*